US010797484B2

(12) United States Patent
Eda et al.

(10) Patent No.: US 10,797,484 B2
(45) Date of Patent: Oct. 6, 2020

(54) POWER SUPPLY AND DEMAND PREDICTION SYSTEM, POWER SUPPLY AND DEMAND PREDICTION METHOD AND RECORDING MEDIUM STORING POWER SUPPLY AND DEMAND PREDICTION PROGRAM

(71) Applicant: OMRON Corporation, Kyoto (JP)

(72) Inventors: Takayuki Eda, Tatebayashi (JP); Kazuki Kasai, Tokyo (JP); Hiroshi Imai, Nara (JP); Hiromasa Takatsuka, Tokyo (JP); Fumiji Aita, Nara (JP)

(73) Assignee: OMRON Corporation, Kyoto (JP)

( * ) Notice: Subject to any disclaimer, the term of this patent is extended or adjusted under 35 U.S.C. 154(b) by 370 days.

(21) Appl. No.: 15/750,506

(22) PCT Filed: Nov. 17, 2016

(86) PCT No.: PCT/JP2016/084140
§ 371 (c)(1),
(2) Date: Feb. 6, 2018

(87) PCT Pub. No.: WO2017/145462
PCT Pub. Date: Aug. 31, 2017

(65) Prior Publication Data
US 2018/0248375 A1  Aug. 30, 2018

(30) Foreign Application Priority Data

Feb. 25, 2016  (JP) ................. 2016-033948

(51) Int. Cl.
*H02J 3/32*  (2006.01)
*H02J 7/35*  (2006.01)
(Continued)

(52) U.S. Cl.
CPC ............... *H02J 3/32* (2013.01); *G05B 15/02* (2013.01); *H02J 3/00* (2013.01); *H02J 3/14* (2013.01);
(Continued)

(58) Field of Classification Search
CPC ......... G06Q 10/04; G06Q 50/06; H02J 3/383; H02J 3/381; H02J 3/008
See application file for complete search history.

(56) References Cited

U.S. PATENT DOCUMENTS 10,630,077 B2 * 4/2020 Utamaru ............... H02J 7/0068
2011/0231028 A1 * 9/2011 Ozog ..................... G06Q 50/06
700/291

(Continued)

FOREIGN PATENT DOCUMENTS

| CN | 102349213 | 2/2012 |
| CN | 102884707 | 1/2013 |

(Continued)

OTHER PUBLICATIONS

"International Search Report (Form PCT/ISA/210) of PCT/JP2016/084140", dated Jan. 24, 2017, with English translation thereof, pp. 1-6.

(Continued)

*Primary Examiner* — Kandasamy Thangavelu
(74) *Attorney, Agent, or Firm* — JCIPRNET

(57) ABSTRACT

A power supply and demand prediction system that predicts the power supply and demand of a group including multiple utility customers is provided and includes a communication unit, a demand prediction unit, a power generation prediction unit, and a stored power prediction unit. The communication unit acquires the amount of power stored in each of multiple power storage devices belonging to the group. The demand prediction unit predicts the amount of demand for
(Continued)

power for each utility customer. The power generation prediction unit predicts the amount of power generated by each of multiple solar panels belonging to the group. The stored power prediction unit predicts the amount of power stored in each battery on the basis of the amount of stored power acquired for each power storage device, the amount of demand predicted for each utility customer, and the amount of generated power predicted for each solar panel.

8 Claims, 7 Drawing Sheets

(51) Int. Cl.
    *H02J 3/14*     (2006.01)
    *H02J 3/00*     (2006.01)
    *G05B 15/02*     (2006.01)
    *H02J 3/38*     (2006.01)
    *H02J 13/00*     (2006.01)

(52) U.S. Cl.
    CPC .............. *H02J 3/381* (2013.01); *H02J 7/35* (2013.01); *H02J 13/0006* (2013.01); *G05B 2219/2639* (2013.01); *H02J 3/003* (2020.01); *H02J 3/383* (2013.01); *Y02B 70/3225* (2013.01); *Y02E 40/72* (2013.01); *Y02E 60/722* (2013.01); *Y02E 60/74* (2013.01); *Y02E 70/30* (2013.01); *Y02P 90/50* (2015.11); *Y04S 10/12* (2013.01); *Y04S 10/123* (2013.01); *Y04S 10/14* (2013.01); *Y04S 10/30* (2013.01); *Y04S 20/222* (2013.01)

(56) References Cited

U.S. PATENT DOCUMENTS

| | | | |
|---|---|---|---|
| 2012/0065792 A1* | 3/2012 | Yonezawa | H02J 3/14 700/291 |
| 2012/0197449 A1* | 8/2012 | Sanders | G05B 15/02 700/291 |
| 2013/0066476 A1* | 3/2013 | Tyagi | H02J 3/008 700/291 |
| 2013/0123995 A1* | 5/2013 | Saito | G06Q 10/04 700/291 |
| 2013/0159157 A1* | 6/2013 | Greene | G06Q 10/04 705/37 |
| 2014/0012427 A1* | 1/2014 | Katayama | H02J 3/383 700/291 |
| 2015/0213564 A1* | 7/2015 | Ishida | G06Q 30/0204 705/7.33 |
| 2016/0043596 A1* | 2/2016 | Yamaguchi | H02J 9/061 307/29 |
| 2016/0077507 A1* | 3/2016 | Sheble | G06Q 50/06 700/295 |
| 2017/0005515 A1* | 1/2017 | Sanders | H02J 3/381 |
| 2018/0226804 A1* | 8/2018 | Eda | H02J 13/00034 13/34 |
| 2018/0232818 A1* | 8/2018 | Eda | H02J 3/381 |

FOREIGN PATENT DOCUMENTS

| | | |
|---|---|---|
| CN | 105144529 | 12/2015 |
| CN | 105324790 | 2/2016 |
| EP | 2892123 | 7/2015 |
| JP | 2012-95455 | 5/2012 |
| JP | 2012-175825 | 9/2012 |
| JP | 2013-192351 | 9/2013 |
| JP | 2014-190727 | 10/2014 |
| JP | 2015-122836 | 7/2015 |

OTHER PUBLICATIONS

"Written Opinion of the International Searching Authority (Form PCT/ISA/237)" of PCT/JP2016/084140, dated Jan. 24, 2017, with English translation thereof, pp. 1-12.

"Search Report of Europe Counterpart Application", dated Oct. 10, 2019, p. 1-p. 8.

Office Action of China Counterpart Application, with English translation thereof, dated Apr. 15, 2020, pp. 1-21.

* cited by examiner

| TARGET GROUP | UTILITY CUSTOMER NAME | RATE OF AMOUNT OF STORED POWER | PRESENCE OR ABSENCE OF REQUEST |
|---|---|---|---|
| GROUP G1 | UTILITY CUSTOMER A | 80% | DR TARGET |
| | UTILITY CUSTOMER B | 50% | DR TARGET |

FIG. 6

POWER SUPPLY AND DEMAND PREDICTION SYSTEM, POWER SUPPLY AND DEMAND PREDICTION METHOD AND RECORDING MEDIUM STORING POWER SUPPLY AND DEMAND PREDICTION PROGRAM

CROSS-REFERENCE TO RELATED APPLICATION

This application is a 371 of international application of PCT application serial no. PCT/JP2016/084140, filed on Nov. 17, 2016, which claims the priority benefit of Japan application no. 2016-033948, filed on Feb. 25, 2016. The entirety of each of the above-mentioned patent applications is hereby incorporated by reference herein and made a part of this specification.

TECHNICAL FIELD

The present invention relates to a power supply and demand prediction system, a power supply and demand prediction method, and a power supply and demand prediction program.

DESCRIPTION OF RELATED ART

In recent years, power generators that generate power using renewable energy (e.g., photovoltaic power generators) have been utilized. Since a surplus power purchasing system has been established in Japan, power generated by a photovoltaic power generator, a wind power generator, etc. can be sold to an electric power company.

On the other hand, when the generated power exceeds an amount of power which the electric power company can purchase (hereinafter referred to as output restriction), the generated power cannot be sold to the electric power company, and thus utility customers temporarily store the generated power in a battery. When the power generated by the power generator is more than a residual battery capacity of the battery, another utility customer may be accommodated with this surplus power.

CITATION LIST

Patent Literature

Patent Literature 1: Japanese Unexamined Patent Application Publication No. 2014-190727

SUMMARY OF THE INVENTION

Technical Problem

However, when the power accommodation between the utility customers in this way is frequently performed, a power distribution provider cannot predict supply and demand of a group of utility customers.

That is, the reason for this is that, although a method for accurately estimating a current residual capacity of a battery has been proposed (e.g., see Patent Literature 1), prediction of an amount of stored power of each battery has not been proposed, and it cannot be determined how much power is provided from the batteries in a group of utility customers.

When the supply and demand of the group of utility customers cannot be predicted in this way, a timing at which the power distribution provider will request a demand response cannot be predicted either.

In consideration of the problems in the related art, the present invention is directed to providing a power supply and demand prediction system, a power supply and demand prediction method, and a power supply and demand prediction program, all of which can accurately predict supply and demand of power.

Solution to Problem

A power supply and demand prediction system according to a first invention predicts supply and demand of power of a utility customer group that includes multiple utility customers, and includes individual stored power acquisition unit, an individual demand prediction unit, an individual power generation prediction unit, and an individual stored power prediction unit. The individual stored power acquisition unit acquires an amount of stored power of each of multiple batteries belonging to the utility customer group. The individual demand prediction unit predicts an amount of demand for power for each utility customer. The individual power generation prediction unit predicts an amount of generated power of each of multiple power generation devices belonging to the utility customer group. The individual stored power prediction unit predicts an amount of stored power of each battery on the basis of the amount of stored power acquired for each battery, the amount of demand predicted for each utility customer, and the amount of generated power predicted for each power generation device.

In this way, the amount of stored power of each battery can be predicted on the basis of the amount of stored power acquired for each battery, the amount of demand predicted for each utility customer, and the amount of generated power predicted for each power generation device.

Thereby, an amount of suppliable power can be predicted from each of the amounts of stored power. That is, since an amount of power that can be provided by each battery is detected, the supply and demand of power of the utility customer group can be predicted.

A power supply and demand prediction system according to a second invention is based on the power supply and demand prediction system of the first invention and a utility customer group supply and demand prediction unit predicts the supply and demand of power of the utility customer group on the basis of the amount of stored power predicted for each battery, the amount of demand predicted for each utility customer, and the amount of generated power predicted for each power generation device.

Here, the supply and demand of power of the utility customer group can be predicted on the basis of the amount of stored power predicted for each battery, the amount of demand predicted for each utility customer, and the amount of generated power predicted for each power generation device.

Since the sum of the supplies and demands of power of the utility customer group can be predicted in this way, restriction on the supply of power due to an increase in the demand for a power distribution provider of the utility customer group or surplus of power due to a reduction in the demand for the power distribution provider of the utility customer group can be predicted.

Thereby, the power distribution provider can predict a timing for performing a request and control of the demand response on the utility customer group.

When the supply for which it is predicted that an amount of supply of power supplied from a system to the utility customer group is much is restricted, the DR request and control includes requesting the utility customer to inhibit or stop use of the power or controlling a load to inhibit or stop the use. When the amounts of stored power of the multiple batteries belonging to the utility customer group are much, the DR request and control also includes requesting the utility customer to perform active use of the power or controlling the load to perform the active use.

A power supply and demand prediction system according to a third invention is based on the power supply and demand prediction system of the second invention, and further includes a request target selection unit. The utility customer group supply and demand prediction unit predicts the supply and demand of power of each of multiple utility customer groups. The request target selection unit selects the utility customer group targeted for a demand response request from among the multiple utility customer groups on the basis of the predicted supply and demand of power.

Thereby, the utility customer group targeted for the DR request and control can be selected from among the multiple utility customer groups. For example, the utility customer group in which the supply of power is restricted is selected as the target of the DR request and control.

A power supply and demand prediction system according to a fourth invention is based on the power supply and demand prediction system of the second or third invention, and further includes a utility customer group demand prediction unit, a utility customer group stored power prediction unit, and a utility customer group power generation prediction unit. The utility customer group demand prediction unit predicts the sum of the amounts of demand of the utility customer group from the amount of demand predicted for each utility customer. The utility customer group stored power prediction unit predicts the sum of the amounts of stored power of the multiple batteries belonging to the utility customer group from the amount of stored power predicted for each battery. The utility customer group power generation prediction unit predicts the sum of the amounts of generated power of the multiple power generation devices belonging to the utility customer group from the amount of generated power predicted for each power generation device. The utility customer group supply and demand prediction unit predicts the supply and demand of power on the basis of the predicted sum of the amounts of demand, the predicted sum of the amounts of generated power, and the predicted sum of the amounts of stored power.

In this way, the sum of the amounts of demand of the utility customer group, the sum of the amounts of stored power of the multiple batteries belonging to the utility customer group, and the sum of the amounts of generated power of the multiple power generation devices belonging to the utility customer group are predicted, and thereby the supply and demand of power can be predicted.

A power supply and demand prediction system according to a fifth invention is based on the power supply and demand prediction system of the first invention, and further includes a request target selection unit. The request target selection unit selects the utility customer for whom an amount of suppliable power predicted on the basis of at least one of the amount of stored power predicted for each battery and the amount of generated power predicted for each power generation device is no less than a predetermined threshold as a target of the demand response request.

In this way, the utility customer for whom an amount of suppliable power is no less than a predetermined threshold is selected as the target of the DR request, and thereby the utility customer that makes the request when the DR request is made can be determined.

In this way, the utility customer for whom the amount of stored power is no less than a predetermined threshold is selected as the target of the DR request, and thereby the utility customer that makes the request when the DR request is made can be determined.

For example, when the supply of power from the system is restricted, a countermeasure of, for instance, accommodating another utility customer with the power from the utility customer targeted for the DR request can be provided.

In this way, the utility customer for whom the amount of generated power is no less than a predetermined threshold is selected as the target of the DR request, and thereby the utility customer that makes the request when the DR request is made can be determined.

A power supply and demand prediction system according to a sixth invention is based on the power supply and demand prediction system of the fifth invention, and further includes a notification unit configured to give the demand response request to the utility customer that is selected as the target.

Thereby, the notification of the demand response request can be given to the utility customer that is selected as the target of the demand response request.

A power supply and demand prediction method according to a seventh invention predicts supply and demand of power of a utility customer group that includes multiple utility customers, and includes an individual stored power acquiring step, an individual demand predicting step, an individual power generation predicting step, and an individual stored power predicting step. The individual stored power acquiring step includes acquiring an amount of stored power of each of multiple batteries belonging to the utility customer group. The individual demand predicting step includes predicting an amount of demand for power for each utility customer. The individual power generation predicting step includes predicting an amount of generated power of each of multiple power generation devices belonging to the utility customer group. The individual stored power predicting step includes predicting an amount of stored power of each battery on the basis of the amount of stored power acquired for each battery, the amount of demand predicted for each utility customer, and the amount of generated power predicted for each power generation device.

In this way, the amount of stored power of each battery can be predicted on the basis of the amount of stored power acquired for each battery, the amount of demand predicted for each utility customer, and the amount of generated power predicted for each power generation device.

Thereby, an amount of suppliable power can be predicted from each of the amounts of stored power. That is, since an amount of power that can be provided by each battery is detected, the supply and demand of power of the utility customer group can be predicted.

A power supply and demand prediction program according to an eighth invention is a power supply and demand prediction program that predicts supply and demand of power of a utility customer group that includes multiple utility customers, and makes a computer execute a power supply and demand prediction method that includes an individual stored power acquiring step, an individual demand predicting step, an individual power generation predicting step, and an individual stored power predicting step. The individual stored power acquiring step includes acquiring an amount of stored power of each of multiple batteries belonging to the utility customer group. The individual demand predicting step includes predicting an amount of demand for power for each utility customer. The individual power generation predicting step includes predicting an amount of generated power of each of multiple power generation devices belonging to the utility customer group. The individual stored power predicting step includes predicting an amount of stored power of each battery on the basis of the amount of stored power acquired for each battery, the amount of demand predicted for each utility customer, and the amount of generated power predicted for each power generation device.

In this way, since the power supply and demand prediction program may be executed as a program, and the sum of the demands of power of the utility customer group can be predicted, restriction on the supply of power due to an increase in the demand for a power distribution provider of the utility customer group or surplus of power due to a reduction in the demand for the power distribution provider of the utility customer group can be predicted.

Thereby, the power distribution provider can predict a timing for performing a request and control of the demand response on the utility customer group.

Advantageous Effects of Invention

According to the present invention, a power supply and demand prediction system, a power supply and demand prediction method, and a power supply and demand prediction program capable of accurately predicting the supply and demand of power can be provided.

BRIEF DESCRIPTION OF THE DRAWINGS

FIG. 6 is a view illustrating a DR request target list in the group $G_1$.

DESCRIPTION OF THE EMBODIMENTS

Hereinafter, a power supply and demand prediction system, a power supply and demand prediction method, and a power supply and demand prediction program in an embodiment according to the present invention will be described with reference to the drawings.

Figure 1:
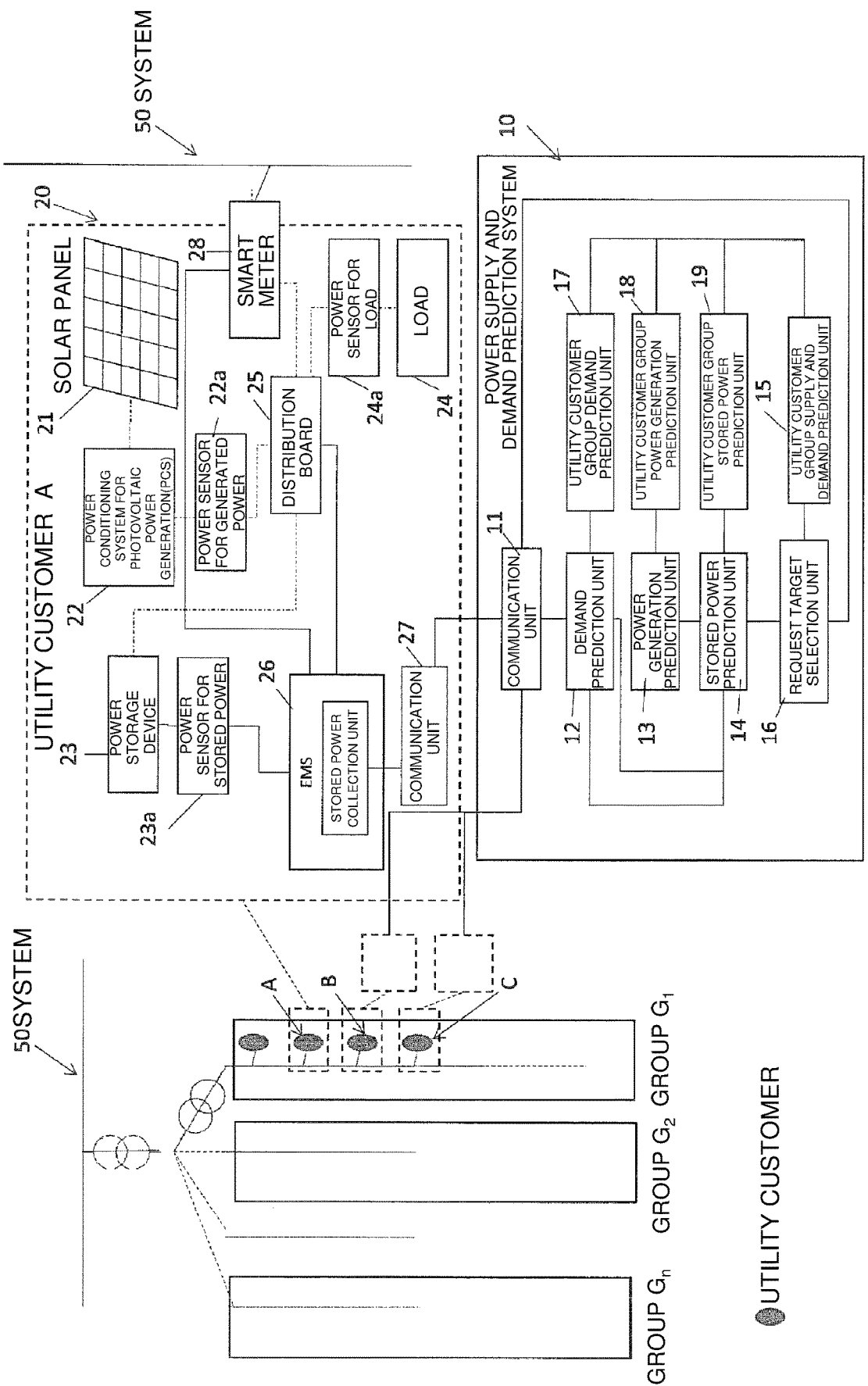
FIG. 1 is a block diagram illustrating a relation between a power supply and demand prediction system and multiple utility customers in an embodiment according to the present invention.

Here, a utility customer A or 20 appearing in the following description has a power generation device (a solar panel 21) and a battery (a power storage device 23) as illustrated in FIG. 1, can buy power from the outside when the power is deficient, and can sell surplus power to the outside when the surplus power is generated.

Like the utility customer A, other utility customers B and C also have a power generation device (a solar panel 21) and a battery (a power storage device 23). The utility customers A, B and C are included in groups G as an example of groups of utility customers. The multiple groups G are provided, and are each connected to a system. In FIG. 1, the multiple groups G are set forth as groups $G_1$, $G_2$, . . . $G_n$.

The utility customer is an individual, a corporation, an organization, etc. that has a contract with an electric power company and uses power supplied from the electric power company via a system 50 (see FIG. 1), and includes, for instance, a general household (a single house or an apartment), an enterprise (a business place, a factory, a facility, etc.), a local government, a government organization, and so on.

The outside described above includes an electric power company, and other utility customers. That is, the outside to which the utility customer A sells the power includes the electric power company, the other utility customers B and C, and so on.

In the following embodiment, a smart meter 28 (see FIG. 1) is a measurement instrument that is installed for each utility customer, measures a power consumption, and sends a result of the measurement to the electric power company or the like using a communication function. By installing the smart meter 28, the electric power company can accurately ascertain a real-time power situation of the utility customer A, and can automate meter reading work that is carried out at each predetermined period. Although not illustrated, the smart meter is also installed for the utility customers B and C.

Further, in the following embodiment, a load 24 (FIG. 1) is a power consumption body such as an air conditioner, a refrigerator, a power range, an IH cooking heater, a television, or the like, for instance, when the utility customer is a general household. For example, when the utility customer is an enterprise (a factory or the like), the load is a power consumption body such as each facility, or an air conditioner that is installed in the factory.

Further, in the following embodiment, an energy management system (EMS) 26 (FIG. 1) is a system that is installed for each utility customer, measures an amount of generated power, an amount of stored power, and a power consumption of each individual load of each utility customer, includes a transmitter that transmits the measured results to a host system using a communication function, and is provided to eliminate an amount of consumed power. The EMS 26 is connected to the power supply and demand prediction system 10 via a network.

Embodiment

<Configuration>

The power supply and demand prediction system 10 according to the present embodiment is a system that predicts supply and demand of power in the groups G (an example of groups of utility customers).

To be specific, the power supply and demand prediction system 10 predicts the sum of amounts of demand in the groups G, the sum of amounts of generated power in the groups G, and the sum of amounts of stored power in the groups G, and predicts the supply and demand of power in the groups G on the basis of the sum of amounts of demand, the sum of amounts of generated power, and the sum of amounts of stored power.

The power supply and demand prediction system 10 makes a prediction about the supply and demand of power with regard to multiple groups G, narrows down the groups G that are targeted for a demand response (DR) request, and selects a utility customer that is targeted for the DR request within the groups G.

A solid line connecting each configuration illustrated in FIG. 1 indicates a flow of information such as data, and an alternate long and short dash line indicates a flow of an electric current.

The configuration of the power supply and demand prediction system 10 of the present embodiment will be described in detail later.

(Utility Customer)

As illustrated in FIG. 1, the power supply and demand prediction system 10 of the present embodiment is connected to the EMS 26 of each utility customer (e.g., the utility customer A or 20).

As illustrated in FIG. 1, the utility customer A or 20 includes a solar panel (a power generation device) 21, a power conditioning system (PCS) for photovoltaic power generation 22, a power sensor for generated power 22a, a power storage device (a battery) 23, a power sensor for stored power 23a, a load 24, power sensor for a load 24a, a distribution board 25, an energy management system (EMS) 26, a communication unit 27, and a smart meter 28.

The solar panel (the power generation device) 21 is a device that generates electricity using a photovoltaic effect using light energy of sunlight, and is installed on a roof or the like of the utility customer A. An amount of generated power in the solar panel 21 can be predicted on the basis of information about a sunshine duration of a weather forecast.

As illustrated in FIG. 1, the power conditioning system (PCS) for photovoltaic power generation 22 is connected to the solar panel 21, and converts a direct current generated at the solar panel 21 into an alternating current.

As illustrated in FIG. 1, the power sensor for generated power 22a is connected to the PCS for photovoltaic power generation 22, and measures an amount of power generated at the solar panel 21. The power sensor for generated power 22a transmits a measured result (an amount of generated power) to the EMS 26.

The power storage device (the battery) 23 is provided to temporarily store surplus power, which is not consumed by the load 24, out of the power generated at the solar panel 21. Thereby, even when a power consumption caused by the load 24 is small during a time period in the daytime in which the power is generated by the solar panel 21, the surplus power is stored in the power storage device 23, and thereby the wastefulness of discarding the generated power can be eliminated.

As illustrated in FIG. 1, the power sensor for stored power 23a is connected to the power storage device 23, and measures an amount of power stored in the power storage device 23. The power sensor for stored power 23a transmits a measured result (an amount of stored power) to the EMS 26.

As described above, the load 24 is a power consumption body such as a home appliance such as an air conditioner, a refrigerator, etc. in the general household, and a facility, an air-conditioning device in the factory or the like, and consumes the power supplied from the system 50, the power generated by the solar panel 21, and the power stored in the power storage device 23.

As illustrated in FIG. 1, the power sensor for a load 24a is connected to the load 24, and measures an amount of power consumed by the load 24. The power sensor for a load 24a transmits a measured result (an amount of consumed power) to the EMS 26.

As illustrated in FIG. 1, the distribution board 25 is connected to the power sensor for generated power 22a, the power sensor for stored power 23a, the power sensor for a load 24a, and the smart meter 28. The distribution board 25 supplies the load 24 with the power generated at the solar panel 21, the power stored in the power storage device 23, or the power bought from the system 50.

As described above, the energy management system (EMS) 26 is an energy management system that is provided to reduce the amount of consumed power of the utility customer A or 20 and, as illustrated in FIG. 1, is connected to the power sensor for generated power 22a, the power sensor for stored power 23a, and the power sensor for a load 24a. The EMS 26 is connected to the communication unit 27. Further, the EMS 26 efficiently supplies the load 24 with the power generated by the solar panel 21 and the amount of stored power in the power storage device 23 using the detected result received from each of the sensors 22a, 23a and 24a.

Thereby, consumption of the power supplied from the system 50 is inhibited, so that a power cost of the utility customer A or 20 can be effectively reduced.

The EMS 26 has a stored power collection unit 26a connected to the power sensor for stored power 23a, and the stored power collection unit 26a collects the amount of stored power of the power storage device 23. The collection of the amount of stored power is performed by the current or the voltage that is detected by the power sensor for stored power 23a.

The communication unit 27 transmits the amount of stored power, which is collected by the stored power collection unit 26a, to the power supply and demand prediction system 10. The communication unit 27 performs communication with the communication unit 11 of the power supply and demand prediction system 10 by radio or by wire.

As described above, the smart meter 28 measures the amount of generated power of the solar panel 21 belonging to the utility customer A or 20, the amount of stored power of the power storage device 23, and the amount of consumed power of the load 24. As illustrated in FIG. 1, the smart meter 28 is connected to each of the sensors 22a, 23a and 24a via the distribution board 25. Further, the smart meter 28 has a communication function, and transmits information about the amount of generated power, the amount of stored power, and the amount of consumed power at the utility customer A or 20 to the electric power company.

The utility customers B and C of the group G1 also have the same configuration as the utility customer A. Other utility customers are also included in the group G1. The other utility customers may not have all or one of the power generation device and the power storage device.

The group $G_1$ that is one of the groups G will be mainly described, but the same applies to the other groups $G_2$ to $G_n$. The utility customer having both of the power generation device and the power storage device, the utility customer having one of the power generation device and the power storage device, or the utility customer having neither the power generation device nor the power storage device is included in the groups G.

(Power Supply and Demand Prediction System)

The power supply and demand prediction system 10 of the present embodiment predicts the power supply and demand of each of the groups G. The power supply and demand prediction system 10 has a communication unit 11, a demand prediction unit 12, a power generation prediction unit 13, a stored power prediction unit 14, a utility customer group supply and demand prediction unit 15, a request target selection unit 16, a utility customer group demand prediction unit 17, a utility customer group power generation prediction unit 18, and a utility customer group stored power prediction unit 19.

The communication unit (the stored power acquisition unit) 11 receives information about the amount of stored power of each of the power storage devices 23 belonging to the group G. In other words, the communication unit 11 receives information about the amount of stored power from the utility customer having the power storage device 23.

The communication unit 11 performs communication with the communication unit 27 belonging to, for instance, the utility customer A or 20 of the group $G_1$, and acquires information about the amount of charged power of the power storage device 23. The other utility customers B and C having the power storage devices also have the communication units, and the communication units 11 also receive information about the amounts of stored power of the utility customers B and C. That is, the communication unit 11 acquires the amount of stored power of each utility customer having the power storage device.

The communication unit 11 notifies the utility customer that is targeted for a DR request of the DR request.

The demand prediction unit 12 makes a prediction about a demand of each utility customer in the group G. For example, the demand prediction unit 12 predicts a demand which each of the utility customer A, the utility customer B, the utility customer C, etc. included in the group $G_1$ requires. The prediction of the demand can be made on the basis of the information about the weather forecast or the like. The prediction of the demand may be made on the basis of past demand data such as a life pattern, a change in the amount of consumed power, etc. of each of the utility customers A, B, C, etc.

The demand prediction unit 12 predicts a demand a [kW] at a predetermined time and an accumulated demand as [kWh] from a present time to a predetermined time. In other words, the demand prediction unit 12 predicts an occasional demand a [kW] predicted with time, and an accumulated demand as [kWh] from a present time to a time at which the demand a [kW] is predicted.

The power generation prediction unit 13 makes a prediction about an amount of generated power of each solar panel 21 belonging to the group G. In other words, the power generation prediction unit 13 predicts an amount of generated power of the utility customer having the solar panel 21. The prediction of the amount of generated power may be made from the amount of generated power of the solar panel 21, for instance, on the basis of information about a weather forecast (a temperature and a humidity) or the like, or on the basis of past data of the amount of generated power.

The power generation prediction unit 13 predicts an amount of generated power b [kW] of the solar panel 21 at a predetermined time and an accumulated amount of generated power bs [kWh] from a present time to a predetermined time. In other words, the power generation prediction unit 13 predicts an occasional amount of generated power b [kW] predicted with time, and an accumulated amount of generated power bs [kWh] from a present time to a time at which the amount of generated power b [kW] is predicted.

The stored power prediction unit 14 makes a prediction about an amount of stored power of each power storage device 23 belonging to the group G. The stored power prediction unit 14 predicts an amount of stored power d [kWh] of each power storage device 23 at a predetermined time on the basis of an amount of stored power c [kWh] of each power storage device 23 at a present time which is acquired by the communication unit 11, the accumulated demand as [kWh] of each utility customer which is predicted by the demand prediction unit 12, and the accumulated amount of generated power bs [kWh] of each solar panel 21 which is predicted by the power generation prediction unit 13.

To be specific, in the case of the utility customer A or 20, an amount of stored power d [kWh] at a predetermined time is calculated from the amount of stored power c [kWh] of the power storage device 23 at a present time by a formula, c+bs−as.

The amount of stored power d [kWh] is calculated at each time of a fixed interval (at each predetermined time) within a fixed period from a present time, and thereby the prediction of the amount of stored power within the fixed period from the present time can be made.

The utility customer group demand prediction unit 17 adds the demand a of each utility customer included in the group G, thereby calculating an occasionally predicted total demand Ta [kW] of the group G. For example, in the case of the group $G_1$, the demands a of the utility customers A, B, C, etc. are added, and the total demand Ta in the group $G_1$ is calculated.

The utility customer group power generation prediction unit 18 adds a predicted amount of generated power b [kW] of each solar panel 21 belonging to the group G, thereby calculating an occasionally predicted total amount of generated power Tb [kW] of the solar panels 21 belonging to the group G.

The utility customer group stored power prediction unit 19 adds a predicted amount of stored power d of each power storage device 23 belonging to the group G, thereby calculating an occasionally predicted total amount of stored power Td of the power storage devices 23 belonging to the group G. The utility customer group supply and demand prediction unit 15 predicts the supply and demand of power for the group G on the basis of the predicted total demand Ta, the predicted total amount of generated power Tb, and the predicted total amount of stored power Td.

By predicting the supply and demand of power in this way, for example, since it is found that the total amount of generated power Tb is reduced with respect to the total demand Ta in the group G at a predetermined time, the DR request can be performed for the utility customer having a large amount of stored power such that another utility customer is accommodateed with the power.

The request target selection unit 16 selects the utility customer targeted for the DR request on the basis of the amount of stored power of each power storage device 23 which is predicted by the stored power prediction unit 14. In detail, the utility customer having the power storage device 23 in which a ratio of the amount of stored power to a full charge is higher than or equal to a predetermined ratio is subject to the DR request.

<Operation>

Next, an operation of the power supply and demand prediction system 10 of the embodiment according to the present invention will be described, and an example of a power supply and demand prediction method is also described.

Figure 2:
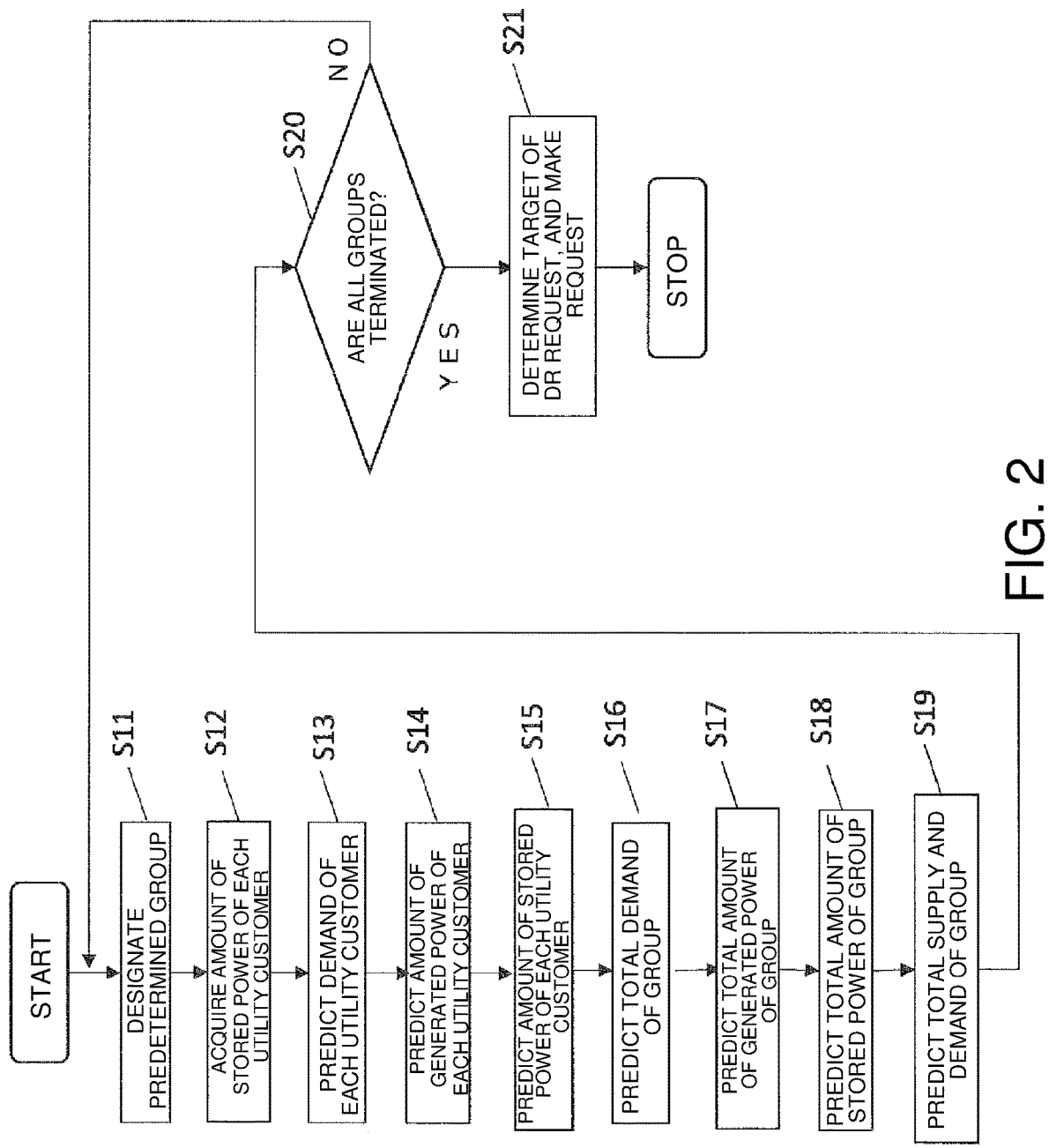
FIG. 2 is a flow chart illustrating an operation of the power supply and demand prediction system illustrated in FIG. 1.

FIG. 2 is a flow chart illustrating an operation of the power supply and demand prediction system 10 of the present embodiment.

As illustrated in FIG. 2, the power supply and demand prediction system 10 makes a prediction about the supply and demand of the groups $G_1$, $G_2$ ... Gn in steps S11 to S20. In step S21, the group G targeted for the DR request is narrowed down, and the utility customer targeted for the DR request within this group G is selected.

Hereinafter, a description is made in turn.

In step S11, the power supply and demand prediction system 10 selects one group G from among the group $G_1$, $G_2$, . . . This selection may be well predetermined in an arbitrary order. The selected arbitrary group is defined as $G_1$.

Next, in step S12, the communication unit 11 receives information about an amount of stored power c [kWh] of each power storage device 23 belonging to the group $G_1$ at a present time.

Next, in step S13, the demand prediction unit 12 predicts a demand a [kW] for each utility customer in the group $G_1$ at a predetermined time, and an accumulated demand as [kWh] from a present time to a predetermined time.

Next, in step S14, the power generation prediction unit 13 predicts an amount of generated power b [kW] of the solar panel 21 belonging to the group $G_1$ at a predetermined time, and an accumulated amount of generated power bs [kWh] from a present time to a predetermined time.

Next, in step S15, the stored power prediction unit 14 makes a prediction about an amount of stored power of each power storage device 23 belonging to the group $G_1$. To be specific, as described above, in the case of the utility customer A or 20, an amount of stored power d [kWh] at a predetermined time is calculated from the amount of stored power c [kWh] of the power storage device 23 at a present time by a formula, c+bs−as. When c is a negative value, the amount thereof is supplied from the system 50.

Figure 3:
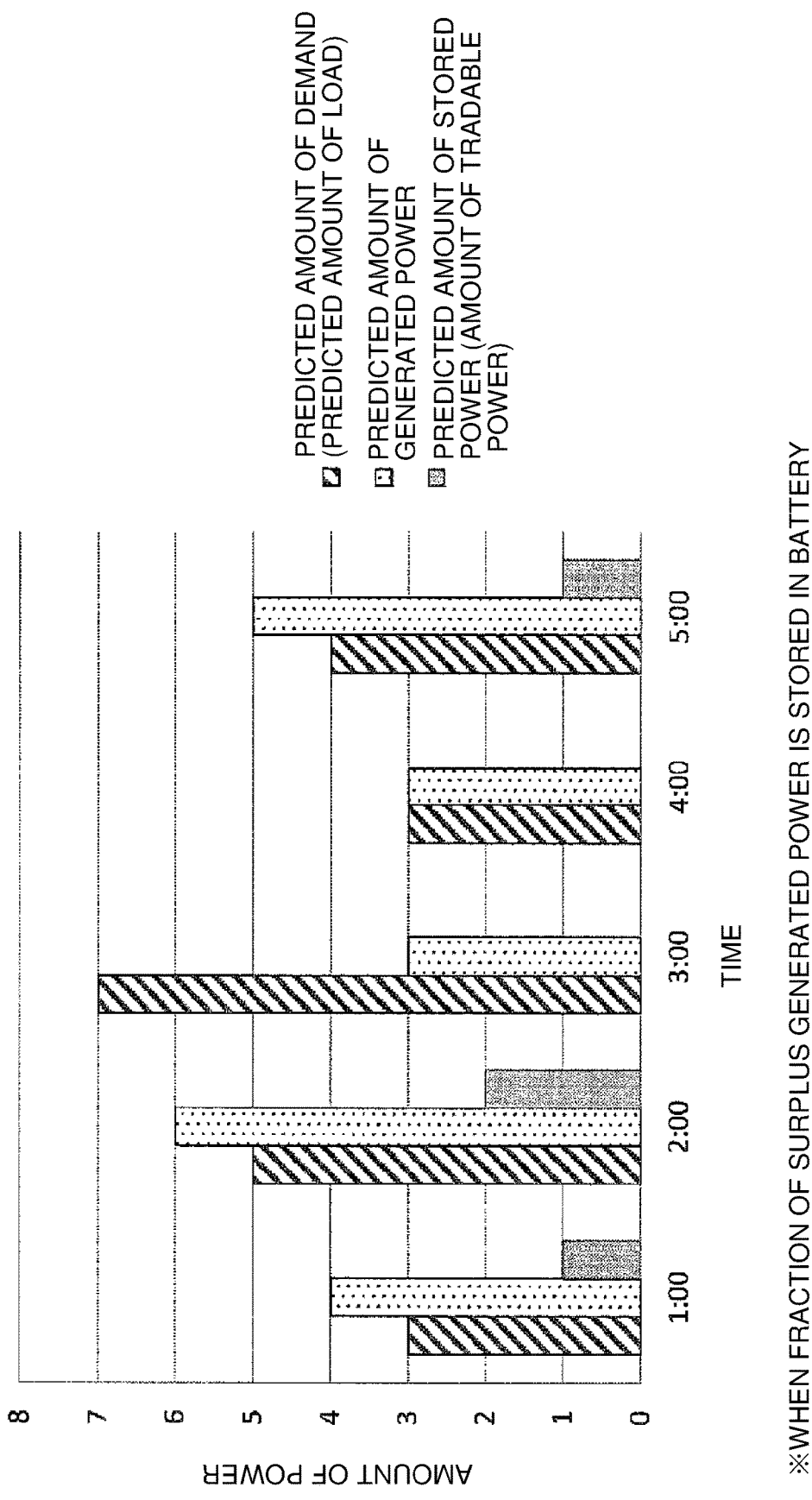
FIG. 3 is a view illustrating a predicted amount of demand, a predicted amount of generated power, and a predicted amount of stored power, all of which are predicted according to FIG. 2.

The amount of stored power d [kWh] is calculated at each time of a fixed interval (at each predetermined time) within a fixed period from a present time, and thereby the prediction of the amount of stored power within the fixed period from the present time can be made. Here, FIG. 3 is a graph illustrated a predicted demand a (a predicted load amount), a predicted amount of generated power b, and a predicted amount of stored power d at intervals of one hour of the utility customer. In FIG. 3, for example at time 1:00, the amount of stored power of the power storage device 23 of the utility customer is 1 kWh, the predicted demand a is 3 kW, and the predicted amount of generated power b is 4 kW. Here, a fraction of the predicted amount of generated power b (a surplus generated power fraction) which exceeds the predicted demand a is stored in the power storage device 23. For this reason, the amount of stored power of the power storage device 23 at 2:00 is 2 kwh.

Next, in step S16, the utility customer group demand prediction unit 17 adds a demand a of each of the utility customers A, B, C . . . included in the group $G_1$, thereby calculating an occasionally predicted total demand Ta [kW] of the group G.

Next, in step S17, the utility customer group power generation prediction unit 18 adds a predicted amount of generated power b [kW] of each solar panel 21 belonging to the group $G_1$, thereby calculating an occasionally predicted total amount of generated power Tb [kW] of the solar panels 21 belonging to the group G.

Next, in step S18, the utility customer group stored power prediction unit 19 adds a predicted amount of stored power d of each power storage device 23 belonging to the group $G_1$, thereby calculating an occasionally predicted total amount of stored power Td of the power storage devices 23 belonging to the group G.

Next, in step S19, the utility customer group supply and demand prediction unit 15 predicts the supply and demand of power for the group $G_1$ on the basis of the predicted total demand Ta, the predicted total amount of generated power Tb, and the predicted total amount of stored power Td.

Next, in step S20, when the prediction of the supply and demand of power is not terminated for all the groups G, the control returns to step S11. When the prediction of the supply and demand of power is terminated for all the groups G that are the groups $G_1$, $G_2$, . . . , the control proceeds to step S21.

The demand a, the accumulated demand as, the amount of generated power b, the accumulated amount of generated power bs, the amount of stored power c, the predicted amount of stored power d, and the total amount of stored power Td, all of which have been described above, are stored in a memory (not shown) or the like.

Next, in step S21, the request target selection unit 16 of the power supply and demand prediction system 10 narrows down the group G targeted for the DR request, selects the utility customer targeted for the DR request, and performs the DR request on the utility customer.

Figure 4:
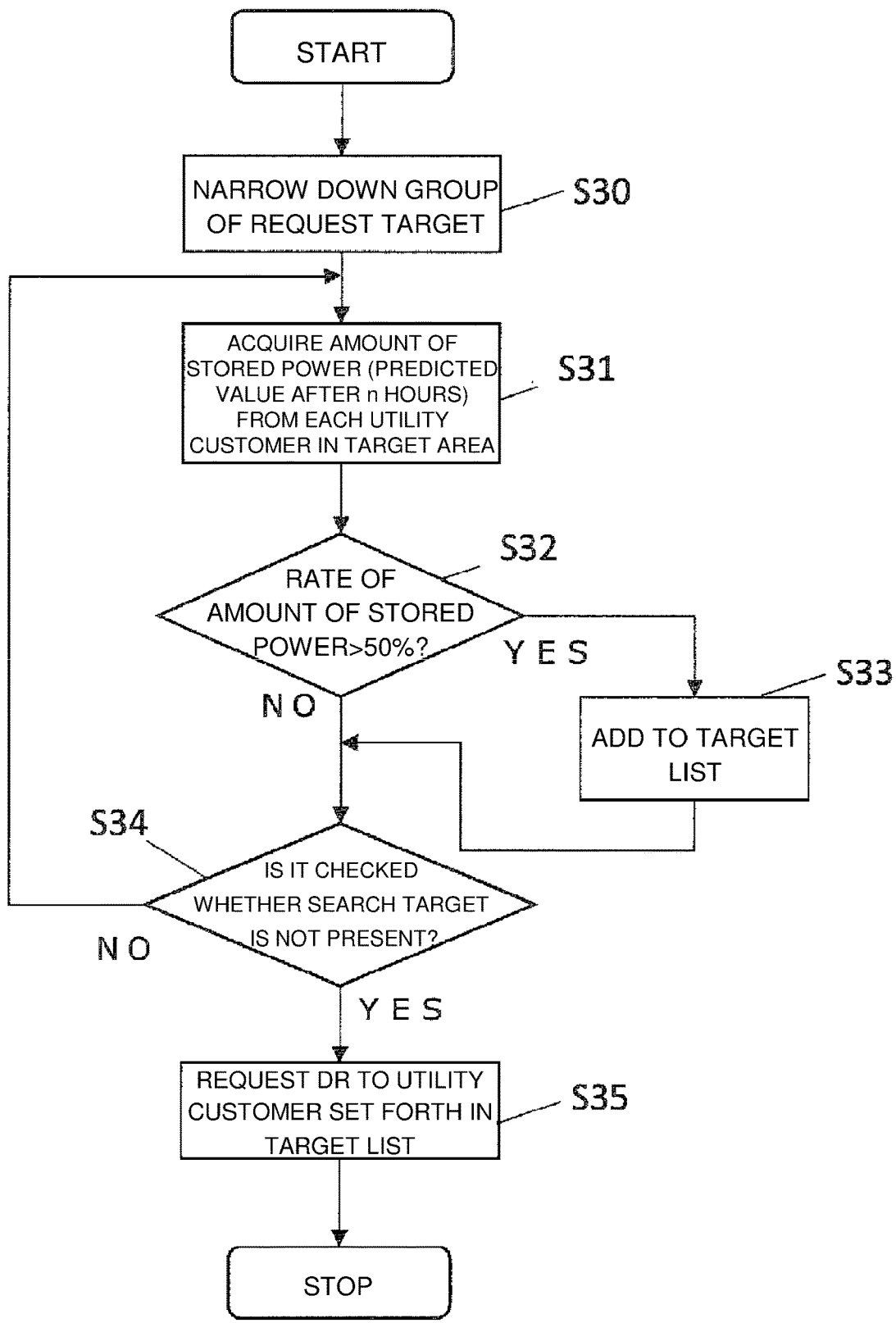
FIG. 4 is a flow chart illustrating an operation of the power supply and demand prediction system illustrated in FIG. 1.

FIG. 4 is a view illustrating a flow of determining a target for the DR request in step S21.

In step S30, the power supply and demand prediction system 10 narrows down the group targeted for the DR request. The power supply and demand prediction system 10 predicts the supply and demand for power of each group G, so that it can be predicted that for instance the supply of power is restricted in any group G at a predetermined time. The power supply and demand prediction system 10 narrows down, for instance, the group G, in which the supply of power is restricted, as the target for the DR request, and sets the group G, which is narrowed as the target, as the group $G_1$.

Next, in step S31, the request target selection unit 16 acquires a predicted amount of stored power d of the utility customer of the target group $G_1$ which is stored in the memory (not shown) as described above at a predetermined time. For example, the request target selection unit 16 acquires a predicted amount of stored power d for the utility customer A at a predetermined time. Here, the predetermined time is a time required to perform the DR request, and this time is detected by the request target selection unit 16 when the group targeted for the DR request is narrowed down.

Next, in step S32, the request target selection unit 16 determines whether or not the predicted amount of stored power at a predetermined time is no less than 50% of a fully charged amount. In the case of no less than 50%, the utility customer is added to a target list of the DR request. For example, when the amount of stored power of the utility customer A is 80% of the fully charged amount, the utility customer A becomes the target list of the DR request.

Next, in step S34, it is determined whether or not another utility customer is present. When the other utility customer is present, the predicted amount of stored power of this utility customer at a predetermined time is acquired from the memory in step S31. Steps S32 and S33 are carried out. That is, it is determined whether or not all the utility customers of the group G are targeted for the DR request.

Figure 5:
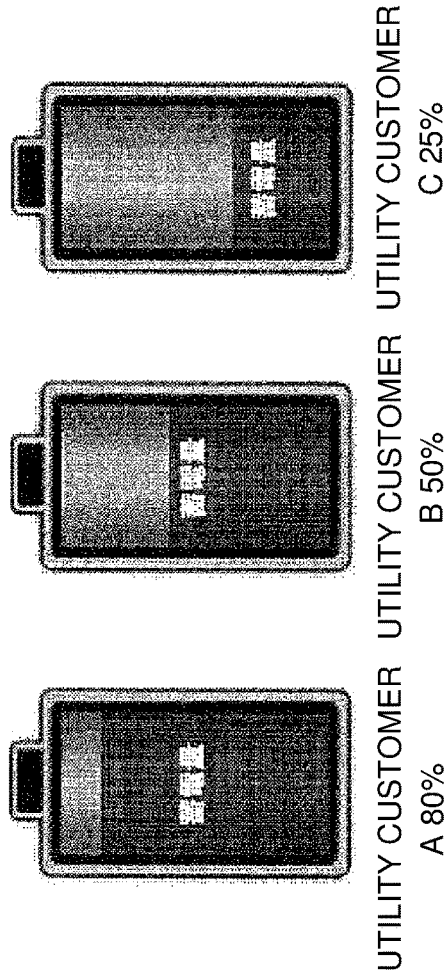
FIG. 5 is a view illustrating an example of a rate of amounts of stored power of utility customers of a group $G_1$.

Among the utility customers present in the group $G_1$, some having the power storage device 23 become the utility customers A, B and C. For example, as illustrated in FIG. 5, when the amount of stored power of the utility customer A is 80% of the fully charged amount, the amount of stored power of the utility customer B is 50% of the fully charged amount, and the amount of stored power of the utility customer C is 25% of the fully charged amount, the utility customers A and B become the target list of the DR request as illustrated in FIG. 6.

In step S35, the DR request is transmitted from the communication unit 11 to the utility customer (the utility customers A and B in the example of FIG. 6) targeted for the DR request.

For example, in a case in which the prediction that an amount of supply is restricted when the time becomes a predetermined time is made, the utility customers A and B are requested such that the power is supplied from the power storage devices 23 of the utility customers A and B to the other utility customers within the group $G_1$ when the time becomes a predetermined time. In a case in which the amount of stored power becomes excessive when the time becomes a predetermined time, the utility customers A and B are requested for active use of power around the predetermined time.

In addition to the request, control may be performed to supply the power to the other utility customers, for instance, by controlling the power storage devices 23 of the utility customers A and B. The loads 24 of the utility customers A and B may be controlled to positively operate the loads 24.

Other Embodiments

While an embodiment of the present invention has been described, the present invention is not limited to the above embodiment, and can be variously modified without departing from the gist of the invention.

(A)

In the first embodiment, the example in which the power supply and demand prediction method is performed according to the flow chart illustrated in FIGS. 2 and 4 has been described by way of example as the power supply and demand prediction method that is an example of the present invention, but the present invention is not limited thereto.

For example, the present invention may be realized as a power supply and demand prediction method program that makes a computer execute the power supply and demand prediction performed according to the flow chart illustrated in FIGS. 2 and 4.

One mode in which the power supply and demand prediction program is used may be an embodiment that is recorded in a recording medium, such as a ROM, which can be read by a computer and that is operated in cooperation with a computer.

Another mode in which the power supply and demand prediction program is used may be an embodiment that is transmitted through a transmission medium such as an internet or a transmission medium such as light, a radio wave, a sound wave, etc., is read by a computer, and is operated in cooperation with a computer.

The aforementioned computer is not limited to hardware such as a CPU, and may include firmware, an OS, and peripherals.

As described above, the power supply and demand prediction method may be realized though software or through hardware.

The power supply and demand prediction system 10 may be a virtual server in a cloud computing system, and a power supply and demand prediction program may be executed by the virtual server.

(B)

The power supply and demand prediction system 10 of the embodiment predicts the supply and demand of power of the multiple groups G, and narrows down the group targeted for the DR request, but it may predict only the supply and demand of one group G, and selects the utility customer targeted for the DR request and the control in this group G.

(C)

In the power supply and demand prediction system 10 and the power supply and demand prediction method of the embodiment, the target of the DR request in step S32 is set to be no less than 50% of the full charge, but it may be an amount of power instead of the percentage.

(D)

Figure 7:
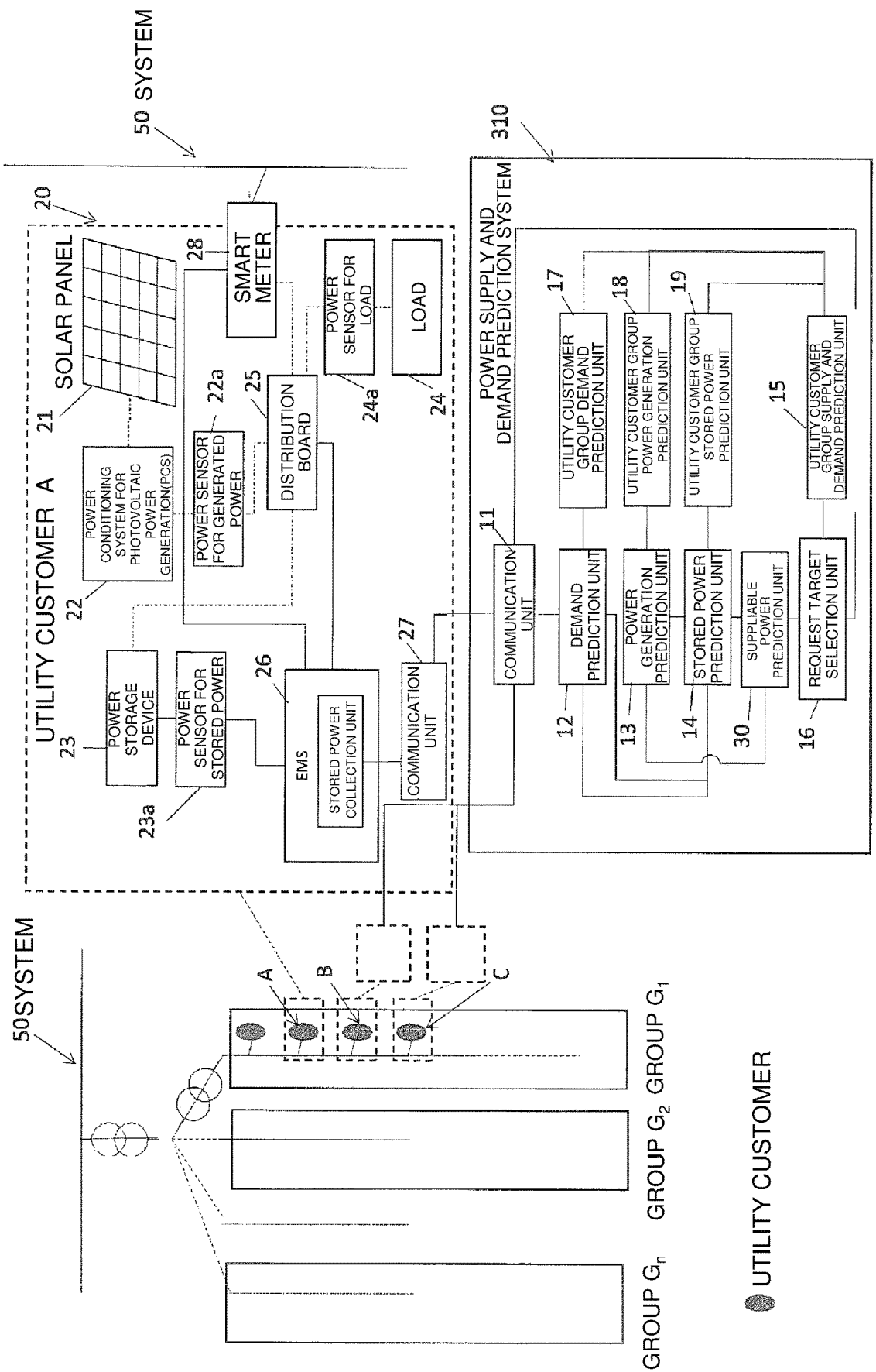
FIG. 7 is a block diagram illustrating a relation between a power supply and demand prediction system and multiple utility customers in a modification of the embodiment according to the present invention.

In the embodiment, the request target selection unit 16 uses the utility customer in which the amount of stored power is no less than a predetermined threshold as the target of the DR request, but it is not limited thereto. For example, like a power supply and demand prediction system 310 illustrated in FIG. 7, a suppliable power prediction unit 30 that predicts an amount of power suppliable to each utility customer from the sum of an amount of generated power of each solar panel 21 which is predicted by a power generation prediction unit 13 and an amount of stored power of each power storage device 23 which is predicted by a stored power prediction unit 14 may be provided.

In this case, a request target selection unit 16 selects a utility customer, in which the amount of suppliable power predicted by the suppliable power prediction unit 30 is no less than a predetermined threshold, as a target of a DR request.

Further, the request target selection unit 16 may select a utility customer, in which the amount of generated power of each solar panel 21 which is predicted by the power generation prediction unit 13 is no less than a predetermined threshold, as the target of the DR request.

(E)

In the embodiment, the power supply and demand prediction system 10 acquires the amount of stored power of each utility customer via the communication unit (e.g., the communication unit 27) belonging to the utility customer, but it is not limited thereto. For example, the communication unit 11 of the power supply and demand prediction system 10 may acquire the amount of stored power from the smart meter 28 belonging to each utility customer.

(F)

In the embodiment, the case in which the solar panel (the photovoltaic power generator) 21 is used as the power generation device belonging to the utility customer has been described by way of example, but the present invention is not limited thereto.

For example, another power generation device such as a wind power generation device, a geothermal power generation device, etc. may be used as the power generation device belonging to each of the multiple utility customers.

INDUSTRIAL APPLICABILITY

The power supply and demand prediction system, the power supply and demand prediction method, and the power supply and demand prediction program of the present invention have an effect capable of accurately predicting the supply and demand of power, and are useful to a utility customer having a battery and a power generation device.

What is claimed is:

1. A power supply and demand prediction system that predicts supply and demand of power of a utility customer group that includes multiple utility customers, comprising:
   a memory; and
   a central processing unit, coupled to the memory,
   wherein the central processing unit acquires an amount of stored power of each of multiple batteries belonging to the utility customer group;
   wherein the central processing unit predicts an amount of demand for power for each utility customer;
   wherein the central processing unit predicts an amount of generated power of each of multiple power generation devices belonging to the utility customer group; and
   wherein the central processing unit predicts an amount of stored power of each battery on the basis of the amount of stored power acquired for each battery, the amount of demand predicted for each utility customer, and the amount of generated power predicted for each power generation device,
   the central processing unit selects the utility customer for whom an amount of suppliable power predicted on the basis of at least one of the amount of stored power predicted for each battery and the amount of generated power predicted for each power generation device is no less than a predetermined threshold as a target of the demand response request,
   the central processing unit transmits the demand response request to the utility customer being the target of the demand response request to supply the power to other utility customers from the utility customer being the target of the demand response request.

2. The power supply and demand prediction system according to claim 1, wherein the central processing unit predicts the supply and demand of power of the utility customer group on the basis of the amount of stored power predicted for each battery, the amount of demand predicted for each utility customer, and the amount of generated power predicted for each power generation device.

3. The power supply and demand prediction system according to claim 2, wherein:
   the central processing unit predicts the supplies and demands of power of each of multiple utility customer groups, and
   the central processing unit selects the utility customer group targeted for a demand response request from among the multiple utility customer groups on the basis of the predicted supply and demand of power.

4. The power supply and demand prediction system according to claim 3,
   wherein the central processing unit predicts a sum of the amounts of demand of the utility customer group from the amount of demand predicted for each utility customer;
   the central processing unit predicts a sum of the amounts of stored power of the multiple batteries belonging to the utility customer group from the amount of stored power predicted for each battery; and
   the central processing unit predicts a sum of the amounts of generated power of the multiple power generation devices belonging to the utility customer group from the amount of generated power predicted for each power generation device,
   wherein the central processing unit predicts the supply and demand of power on the basis of the predicted sum of the amounts of demand, the predicted sum of the amounts of generated power, and the predicted sum of the amounts of stored power.

5. The power supply and demand prediction system according to claim 2, wherein:
   the central processing unit predicts a sum of the amounts of demand of the utility customer group from the amount of demand predicted for each utility customer;
   the central processing unit predicts a sum of the amounts of stored power of the multiple batteries belonging to the utility customer group from the amount of stored power predicted for each battery; and
   the central processing unit predicts a sum of the amounts of generated power of the multiple power generation devices belonging to the utility customer group from the amount of generated power predicted for each power generation device,
   the central processing unit predicts the supply and demand of power on the basis of the predicted sum of the amounts of demand, the predicted sum of the amounts of generated power, and the predicted sum of the amounts of stored power.

6. The power supply and demand prediction system according to claim 1, wherein the central processing unit performs the demand response request for the utility customer that is selected as the target.

7. A power supply and demand prediction method that predicts supply and demand of power of a utility customer group that includes multiple utility customers, comprising:
   acquiring an amount of stored power of each of multiple batteries belonging to the utility customer group;
   predicting an amount of demand for power for each utility customer;
   predicting an amount of generated power of each of multiple power generation devices belonging to the utility customer group;
   predicting an amount of stored power of each battery on the basis of the amount of stored power acquired for each battery, the amount of demand predicted for each utility customer, and the amount of generated power predicted for each power generation device;
   selecting the utility customer for whom an amount of suppliable power predicted on the basis of at least one of the amount of stored power predicted for each battery and the amount of generated power predicted for each power generation device is no less than a predetermined threshold as a target of the demand response request; and
   transmitting the demand response request to the utility customer being the target of the demand response request to supply the power to other utility customers from the utility customer being the target of the demand response request.

8. A non-transitory computer-readable recording medium having a power supply and demand prediction program that predicts supply and demand of power of a utility customer group that includes multiple utility customers making a computer execute a power supply and demand prediction method, the power supply and demand prediction method comprising:
   an individual stored power acquiring step of acquiring an amount of stored power of each of multiple batteries belonging to the utility customer group;
   an individual demand predicting step of predicting an amount of demand for power for each utility customer;

an individual power generation predicting step of predicting an amount of generated power of each of multiple power generation devices belonging to the utility customer group;

an individual stored power predicting step of predicting an amount of stored power of each battery on the basis of the amount of stored power acquired for each battery, the amount of demand predicted for each utility customer, and the amount of generated power predicted for each power generation device;

selecting the utility customer for whom an amount of suppliable power predicted on the basis of at least one of the amount of stored power predicted for each battery and the amount of generated power predicted for each power generation device is no less than a predetermined threshold as a target of the demand response request; and transmitting the demand response request to the utility customer being the target of the demand response request to supply the power to other utility customers from the utility customer being the target of the demand response request.

\* \* \* \* \*